United States Patent
Zhang et al.

(10) Patent No.: US 12,530,895 B2
(45) Date of Patent: Jan. 20, 2026

(54) APPARATUS AND METHOD WITH IMAGE SEGMENTATION

(71) Applicant: Samsung Electronics Co., Ltd., Suwon-si (KR)

(72) Inventors: Hui Zhang, Beijing (CN); Pingjun Li, Beijing (CN); Byung In Yoo, Suwon-si (KR); Hana Lee, Suwon-si (KR); Yi Zhou, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 549 days.

(21) Appl. No.: 17/981,956

(22) Filed: Nov. 7, 2022

(65) Prior Publication Data
US 2023/0154191 A1    May 18, 2023

(30) Foreign Application Priority Data

Nov. 15, 2021 (CN) .......................... 202111350941.4
Nov. 16, 2021 (CN) .......................... 202111356899.7
Aug. 23, 2022 (KR) .......................... 10-2022-0105708

(51) Int. Cl.
*G06V 20/40* (2022.01)
*G06V 10/77* (2022.01)

(52) U.S. Cl.
CPC .......... *G06V 20/49* (2022.01); *G06V 10/7715* (2022.01); *G06V 20/41* (2022.01); *G06V 20/46* (2022.01)

(58) Field of Classification Search
CPC .... G06V 20/49; G06V 10/7715; G06V 20/41; G06V 20/46; G06V 10/806; G06V 20/70
See application file for complete search history.

(56) References Cited

U.S. PATENT DOCUMENTS

| | | | |
|---|---|---|---|
| 9,462,028 B1* | 10/2016 | Levinson | H04L 65/765 |
| 10,796,201 B2 | 10/2020 | Li et al. | |
| 2017/0132526 A1* | 5/2017 | Cohen | G06N 20/00 |
| 2019/0311202 A1* | 10/2019 | Lee | G06T 9/002 |
| 2021/0158043 A1 | 5/2021 | Hou et al. | |
| 2021/0383199 A1* | 12/2021 | Weissenborn | G06N 3/063 |
| 2022/0092746 A1* | 3/2022 | Abbeloos | G06T 3/04 |
| 2022/0383628 A1* | 12/2022 | Kipf | G06V 10/82 |
| 2023/0289984 A1* | 9/2023 | Reaungamornrat | G06T 7/11 |

(Continued)

FOREIGN PATENT DOCUMENTS

| | | |
|---|---|---|
| CN | 111428726 A | 9/2020 |
| CN | 112598673 A | 4/2021 |

OTHER PUBLICATIONS

Kim, Dahun, et al. "Video panoptic segmentation." *Proceedings of the IEEE/CVF Conference on Computer Vision and Pattern Recognition*. 2020.

(Continued)

*Primary Examiner* — Santiago Garcia
(74) *Attorney, Agent, or Firm* — NSIP Law

(57) ABSTRACT

Provided is an image segmentation apparatus and method. The image segmentation method includes extracting, from an image, a feature map of the image; generating a second slot matrix by associating the feature map of the image with a first slot matrix corresponding to the image; and obtaining segmentation results of the image based on the second slot matrix.

20 Claims, 13 Drawing Sheets

(56) References Cited

U.S. PATENT DOCUMENTS

2025/0111405 A1* 4/2025 McEachran ........ G06Q 30/0277

OTHER PUBLICATIONS

Qiao, Siyuan, et al. "Vip-deeplab: Learning visual perception with depth-aware video panoptic segmentation." *Proceedings of the IEEE/CVF Conference on Computer Vision and Pattern Recognition.* 2021.
Locatello, Francesco, et al. "Object-centric learning with slot attention." *Advances in Neural Information Processing Systems* 33 (2020): 11525-11538.
Wang, Huiyu, et al. "Max-deeplab: End-to-end panoptic segmentation with mask transformers." *Proceedings of the IEEE/CVF conference on computer vision and pattern recognition.* 2021.

* cited by examiner

APPARATUS AND METHOD WITH IMAGE SEGMENTATION

CROSS-REFERENCE TO RELATED APPLICATIONS

This application claims the benefit under 35 USC § 119(a) of Chinese Patent Application No. 202111350941.4 filed on Nov. 15, 2021, and Chinese Patent Application No. 202111356899.7 filed on Nov. 16, 2021, in the China National Intellectual Property Administration, and Korean Patent Application No. 10-2022-0105708 filed on Aug. 23, 2022, in the Korean Intellectual Property Office, the entire disclosures of which are incorporated herein by reference for all purposes.

BACKGROUND

1. Field

The following description relates to an image processing technology, and more particularly, to an apparatus and method with image segmentation.

2. Description of Related Art

Image panoramic segmentation is a process of assigning labels to respective pixels of a two-dimensional (2D) image. Contents included in an image may be generally divided into two types: one is "stuff" and the other is "thing." The stuff content may be content that does not require the distinguishment of different objects belonging to the same category, such as, for example, grass, sky, and buildings, and the stuff content may thus be associated with uncountable objects. The thing content may be content that requires the distinguishment of different objects belonging to the same category (e.g., a category of "human being"), such as, for example, people or cars. Thus, in the thing content, objects belonging to the same category may need to be distinguished from each other, and thus the thing content may be associated with countable objects.

Panoramic segmentation may involve a combination of semantic segmentation and instance segmentation. Panoramic segmentation may predict a semantic label for a pixel belonging to "stuff" and an instance label for a pixel belonging to a "thing."

Video panoramic segmentation may be an extension of image panoramic segmentation in a time domain. In addition to panoramic segmentation for each image, video panoramic segmentation may include object tracking. For example, video panoramic segmentation may assign the same label to pixels belonging to the same instance in different temporally related images.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a computing device, includes one or more processors connected with a memory, the memory storing computer-readable instructions configured to cause the processor to extract, from an image, a feature map of the image, generate a second slot matrix by associating the feature map of the image with a first slot matrix corresponding to the image, and obtain segmentation results of the image based on the second slot matrix.

The image may be a current frame of a video, and the computer-readable instructions may be further configured to cause the processor to extract a feature map of a history frame of the video, generate a fourth slot matrix by associating the feature map of the history frame with a third slot matrix corresponding to the history frame, and obtain segmentation results of the current frame and the history frame based on the second slot matrix and the fourth slot matrix, and the history frame may be one or more frames chronologically preceding the current frame in the video.

The history frame may be one of a plurality of history frames, the fourth slot matrix may be one of a plurality of fourth slot matrices, each respectively corresponding to the history frames.

The associating the feature map of the image with the first slot matrix corresponding to the image may include performing one or more cascaded association operations on the feature map of the image and the first slot matrix corresponding to the image, each of the association operations may include associating the feature map of the image with an initial slot matrix or a slot matrix output from a previous association operation, and outputting an associated slot matrix.

The associating the feature map of the image with the first slot matrix corresponding to the image further may include performing one or more cascaded association operations, each of the association operations may include associating the feature map of the current frame with an initial slot matrix or a slot matrix corresponding to the current frame output from a previous association operation, and obtaining an associated slot matrix corresponding to the current frame, associating the feature map of the history frame with an initial slot matrix or a slot matrix corresponding to the history frame output from a previous association operation, and obtaining an associated slot matrix corresponding to the history frame, and associating the associated slot matrix corresponding to the current frame with the associated slot matrix corresponding to the history frame, and obtaining an associated slot matrix corresponding to the current frame and an associated slot matrix corresponding to the history frame.

The associating the feature map of the image with the first slot matrix corresponding to the image further may include performing one or more cascaded first association operations, and performing one or more cascaded second association operations, each of the first association operations may include associating the feature map of the current frame with an initial slot matrix or a slot matrix output from a previous first association operation, and outputting an associated slot matrix corresponding to the current frame, and each of the second association operations may include associating the feature map of the history frame with an initial slot matrix or a slot matrix output from a previous second association operation, and outputting an associated slot matrix corresponding to the history frame.

The associating the feature map of the image with the first slot matrix corresponding to the image may further include associating a slot matrix corresponding to the current frame output from the first association operations with a slot matrix corresponding to the history frame output from the second association operations, and outputting an associated slot matrix corresponding to the current frame and an associated slot matrix corresponding to the history frame.

A slot vector of the first slot matrix may represent an object in the image.

The obtaining the segmentation results of the image based on the second slot matrix may include predicting a mask and a category based on the second slot matrix.

The obtaining the segmentation results of the image based on the second slot matrix may include predicting a mask and a category of the current frame based on the second slot matrix, predicting a mask and a category of the history frame based on the fourth slot matrix, and determining an instance identifier (ID) based on the second slot matrix and the fourth slot matrix.

In one general aspect, a method of segmenting an image includes extracting, from the image, a feature map of the image, generating a second slot matrix by associating the feature map of the image with a first slot matrix corresponding to the image, and obtaining segmentation results of the image based on the second slot matrix.

The image may be a current frame of a video, and the method may further include extracting a feature map of a history frame of the video, generating a fourth slot matrix by associating the feature map of the history frame with a third slot matrix corresponding to the history frame, and obtaining segmentation results of the current frame and the history frame based on the second slot matrix and the fourth slot matrix, wherein the history frame is one or more frames chronologically preceding the current frame in the video.

The image may be a current frame of a video that may include the current frame and history frames preceding the current frame in the video, and the method further may further include extracting feature maps of the respective history frames of the video, generating a plurality of fourth slot matrices by associating the feature maps of the history frames with respective third slot matrices respectively corresponding to the history frames, and obtaining segmentation results of the current frame and the history frames based on the second slot matrix and the fourth slot matrices.

The associating the feature map of the image with the first slot matrix corresponding to the image may include performing one or more cascaded association operations on the feature map of the image and the first slot matrix corresponding to the image, wherein each of the association operations may include associating the feature map of the image with an initial slot matrix or a slot matrix output from a previous association operation, and outputting an associated slot matrix.

The associating the feature map of the image with the first slot matrix corresponding to the image may include performing one or more cascaded association operations, wherein each of the association operations may include associating the feature map of the current frame with an initial slot matrix or a slot matrix corresponding to the current frame output from a previous association operation, and obtaining an associated slot matrix corresponding to the current frame, associating the feature map of the history frame with an initial slot matrix or a slot matrix corresponding to the history frame output from a previous association operation, and obtaining an associated slot matrix corresponding to the history frame, and associating the associated slot matrix corresponding to the current frame with the associated slot matrix corresponding to the history frame, and obtaining an associated slot matrix corresponding to the current frame and an associated slot matrix corresponding to the history frame.

The associating the feature map of the image with the first slot matrix corresponding to the image may include performing one or more cascaded first association operations, and performing one or more cascaded second association operations, wherein each of the first association operations may include associating the feature map of the current frame with an initial slot matrix or a slot matrix output from a previous first association operation, and outputting an associated slot matrix corresponding to the current frame, and wherein each of the second association operations may include associating the feature map of the history frame with an initial slot matrix or a slot matrix output from a previous second association operation, and outputting an associated slot matrix corresponding to the history frame.

The associating the feature map of the image with the first slot matrix corresponding to the image further may include associating a slot matrix corresponding to the current frame output from the first association operations with a slot matrix corresponding to the history frame output from the second association operations, and outputting an associated slot matrix corresponding to the current frame and an associated slot matrix corresponding to the history frame.

A slot vector of the first slot matrix represents an object in the image.

The obtaining the segmentation results of the image based on the second slot matrix may include predicting a mask and a category based on the second slot matrix.

The obtaining the segmentation results of the image based on the second slot matrix may include predicting a mask and a category of the current frame based on the second slot matrix, predicting a mask and a category of the history frame based on the fourth slot matrix, and determining an instance identifier (ID) based on the second slot matrix and the fourth slot matrix.

Other features and aspects will be apparent from the following detailed description, the drawings, and the claims.

BRIEF DESCRIPTION OF THE DRAWINGS

FIG. 100 illustrates an example structure of a time-domain slot verification module, according to one or more embodiments.

Figure 1:
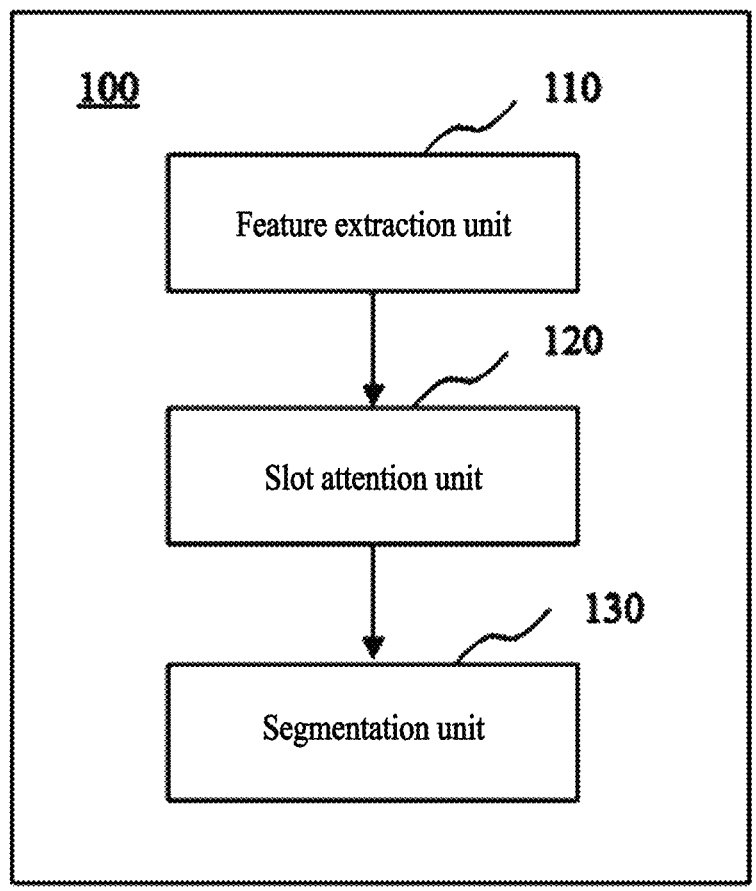
FIG. 1 illustrates an example of a segmentation apparatus, according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, some variables, symbols, and operators representing dimensions of vectors and/or tensors included in the drawings will be described first before the detailed description of the present disclosure for the convenience of understanding.

"C" represents the number of channels of a feature map (i.e., a channel dimension) or the number of channels of a slot vector (i.e., a channel dimension).

"L" represents a maximum number of slot vectors, i.e., a slot dimension.

"H" and "W" represent collectively a resolution of each frame, in which "H" denotes the height and "W" denotes the width.

"nc" represents a total number of categories.

$\boxed{1 \times 1}$ represents a 1*1 convolution operation.

$\otimes$ represents a matrix multiplication operation.

$\oplus$ represents an elementwise addition operation.

"Linear" represents a linear transformation operation.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of a segmentation apparatus 100, according to one or more embodiments.

Referring to FIG. 1, a segmentation apparatus 100 according to an example embodiment may include a feature extraction unit 110, a slot attention unit 120, and a segmentation unit 130.

The feature extraction unit 110 may extract a feature map of an image. The feature extraction unit 110 may be implemented using, for example, a Resnet50 network, a feature pyramid network (FPN), or some variant that includes a convolution operation.

In an example, when extracting an outputted feature map, the feature extraction unit 110 may extract from the image feature maps having different scales. In this example, the feature extraction unit 110 may obtain the outputted feature map having a preset scale by fusing the extracted feature maps having the different scales. The outputted feature map obtained by the feature extraction unit 110 as described above may be provided as an input to the slot attention unit 120.

Figure 2:
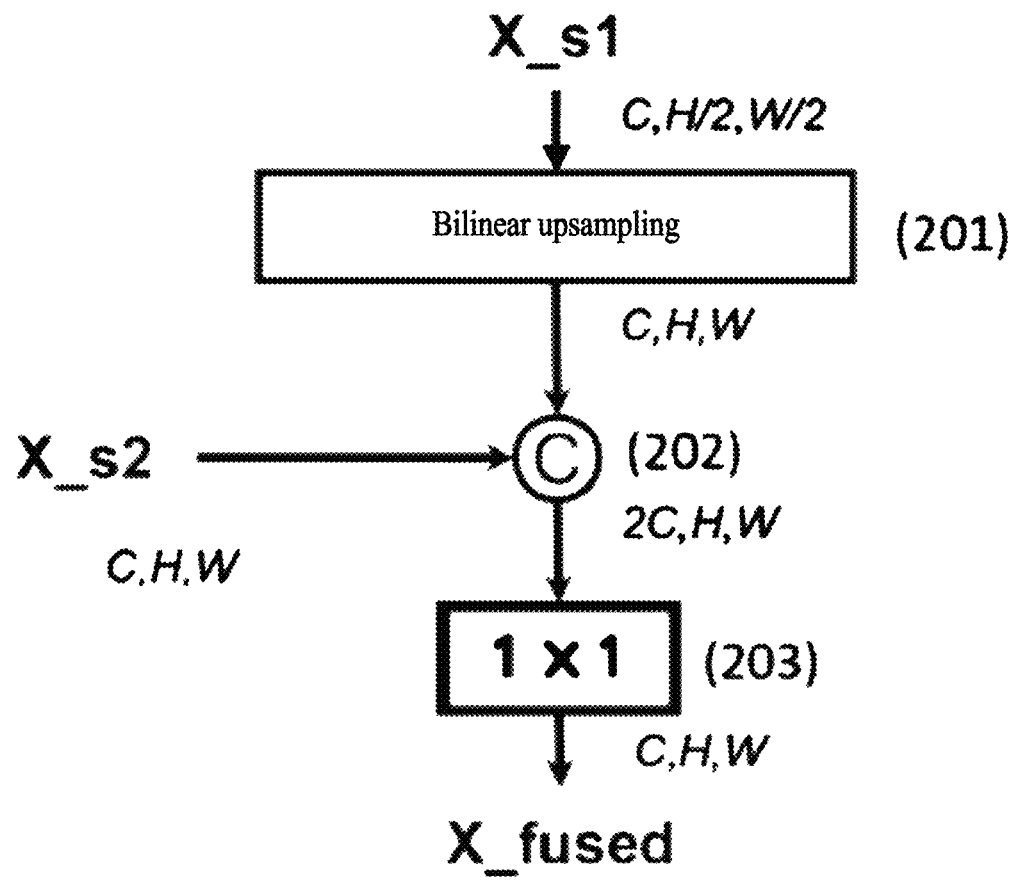
FIG. 2 illustrates an example of a feature map fusing process performed by a feature extraction unit, according to one or more embodiments.

FIG. 2 illustrates an example of a feature map fusing process performed by the feature extraction unit 110.

Referring to FIG. 2, the size of a feature map X_s1 extracted from an image by the feature extraction unit 110 may be (C, H/2, W/2), and the size of a feature map X_s2 extracted from the image by the feature extraction unit 110 may be (C, H, W). It is assumed that the size of the feature map X_s1 is ¼ (that is, half the width and height of the feature map X_s2) of the feature map X_s2. In this case, the feature extraction unit 110 may perform bilinear upsampling on the feature map X_s1 to increase its size to that of X_s2 in step 201. The feature extraction unit 110 may then concatenate the feature maps X_s1 and X_s2 such that the number of channels becomes 2C to generate a single map in step 202. Finally, the feature extraction unit 110 may reduce the number of channels by 1*1 convolution to obtain a fused feature map X_fused in step 203.

Although FIG. 2 illustrates only the fusion of feature maps of two scales, the fusion processing algorithm described above may be invoked multiple times with a similar process to fuse feature maps of a greater number of scales, which will not be further described here for conciseness. In addition, although a fused feature map may be obtained by fusing a plurality of feature maps of different scales through the fusing process described above, the outputted feature map obtained through the fusion process may have a feature fused from each fusion, and thus the fused feature may still have multi-scale features.

Referring back to FIG. 1, the slot attention unit 120 may associate the outputted feature map (of the image) received from the feature extraction unit 110 with a first slot matrix (corresponding to the image) to generate a second slot matrix. The segmentation unit 130 may obtain a segmentation result of the image (e.g., an image label map) based on the second slot matrix received from the slot attention unit 120.

In an example, a slot vector of a slot matrix may be used to represent an object in an image, and each slot vector may correspond to one object. Each slot vector may include parameters used to predict a mask, a category, and an instance identifier (ID) of a corresponding object. The first slot matrix input to the slot attention unit 120 may be a preset initial slot matrix. In an example, the same initial slot matrix may be used to process different frames.

In an example, for "stuff" content (e.g., an uncountable object such as the sky), all pixels belonging to the same category may be considered to be parts of the same/one panorama object. For example, all pixels belonging to a category of "sky" may form one "sky" panorama object. In addition, for "thing" content (e.g., a countable object such as a pedestrian, a car, etc.), each object may be considered a panorama object. For example, each pedestrian object belonging to a category of "pedestrian" may be considered an independent panorama object, and different pedestrian objects may be considered different respective panorama objects. For example, there may be three panorama objects belonging to the category of "pedestrian," and these three panorama objects may be identified as different panorama objects, such as, a panorama object "pedestrian 1," a panorama object "pedestrian 2," and a panorama object "pedestrian 3." Hereinafter, for the convenience of description, each panorama object in a frame will be represented as a slot vector having a vector length of C, and all panorama objects in a frame will be represented using L slots, in which L denotes a maximum number of slot vectors and may be generally set to be greater than the number of panorama objects in a frame. All the panorama objects of the corresponding frame may be represented by a matrix formed from their respective slot vectors, i.e., the panorama objects may be represented as a slot matrix of L×C.

In an example, the segmentation apparatus 100 may perform a segmentation process on an image and may also perform the segmentation process on a video.

When the segmentation apparatus 100 processes a single image, the feature extraction unit 110 may extract a feature map of the image, the slot attention unit 120 may associate the feature map of the image with a first slot matrix corresponding to the image to generate a second slot matrix, and the segmentation unit 130 may then obtain a segmentation result of the image based on the second slot matrix.

When the segmentation apparatus 100 processes a video, the feature extraction unit 110 may extract a feature map of a current frame in the video, and the slot attention unit 120 may associate the feature map of the current frame with a first slot matrix corresponding to the current frame to generate a second slot matrix. In addition, the feature extraction unit 110 may also extract a feature map of a history frame (i.e., at least one frame before the current frame) from the video before or when the generation of the second slot matrix is performed on the current frame. The history frame may be at least one frame before the current frame in the video. For example, the history frame may be one frame immediately before the current frame in the video. Alternatively, the history frame may be m frames immediately before the current frame, in which "m" is an integer greater than or equal to 2. The slot attention unit 120 may also associate the feature map of the history frame with a third slot matrix corresponding to the history frame to generate a fourth slot matrix. Subsequently, the segmentation unit 130 may obtain segmentation results of the current frame and the history frame based on the second slot matrix and the fourth slot matrix.

When there are multiple history frames, multiple such fourth slot matrices respectively corresponding to the history frames may be generated. For example, when there are two history frames and slot matrices corresponding to the history frames are a slot matrix a and a slot matrix b, a slot matrix a' may be generated in association with the slot matrix a and a slot matrix b' may be generated in association with the slot matrix b. Subsequently, the segmentation unit 130 may obtain segmentation results of the current frame and the history frames based on the second slot matrix, the slot matrix a', and the slot matrix b'.

In an example, the slot attention unit 120 may include one or more cascaded space-domain slot attention modules. Each of the space-domain slot attention modules may associate a feature map of an image with an initial slot matrix or a slot matrix output from a previous space-domain slot attention module to output an associated slot matrix.

In another example, the slot attention unit 120 may include one or more cascaded space/time domain slot attention modules. In this example, each of the space/time slot attention modules may include a space-domain slot attention module and a time-domain slot attention module. The space-domain slot attention module may associate, with a feature map of a current frame, an initial slot matrix or a slot matrix corresponding to the current frame output from a previous space/time slot attention module and may also associate, with a feature map of a history frame, an initial slot matrix or a slot matrix corresponding to the history frame output from the previous space/time slot attention matrix to output an associated slot matrix corresponding to the current frame and an associated slot matrix corresponding to the history frame. The time-domain slot attention module may associate the associated slot matrix corresponding to the current frame with the associated slot matrix corresponding to the history frame to output an associated slot matrix corresponding to the current frame and an associated slot matrix corresponding to the history frame.

In another example, the slot attention unit 120 may include one or more cascaded first space-domain slot attention modules and one or more cascaded second space-domain slot attention modules. Each of the first space-domain slot attention modules may associate a feature map of a current frame with an initial slot matrix or a slot matrix output from a previous first space-domain slot attention module to output an associated slot matrix corresponding to the current frame. Each of the second space-domain slot attention modules may associate a feature map of a history frame with an initial slot matrix (or with a slot matrix output from a previous second space-domain slot attention module) to output an associated slot matrix corresponding to the history frame. In addition, the slot attention unit 120 may further include a time-domain slot attention module configured to associate the slot matrix corresponding to the current frame output from the space-domain slot attention module with the slot matrix corresponding to the history frame to output an associated slot matrix corresponding to the current frame and an associated slot matrix corresponding to the history frame.

Hereinafter, structure and operations of some examples of the slot attention unit 120 will be described with reference to FIGS. 3 and 4. Structure of the slot attention unit 120 to be described hereinafter with the accompanying drawings is provided only as an example structure of the slot attention unit 120, and the purpose therefor is to assist one of ordinary skill in the art in more clearly understanding the slot attention unit 120 and in more readily understanding other structures of the slot attention unit 120 not shown in the drawings by referring to the structure shown in the drawings.

Hereinafter, for the convenience of description, a current frame will be indicated as a "frame t" and a previous frame of the current frame will be indicated as a "frame t−1." In addition, a feature map corresponding to the current frame will be indicated as a "feature map t" and a feature map corresponding to the previous frame of the current frame will be indicated as a "feature map t−1." In addition, a slot matrix corresponding to the current frame will be indicated as a "slot matrix $S_t$," and a slot matrix corresponding to the frame previous to the current frame will be indicated as a "slot matrix $S_{t-1}$."

Figure 3:
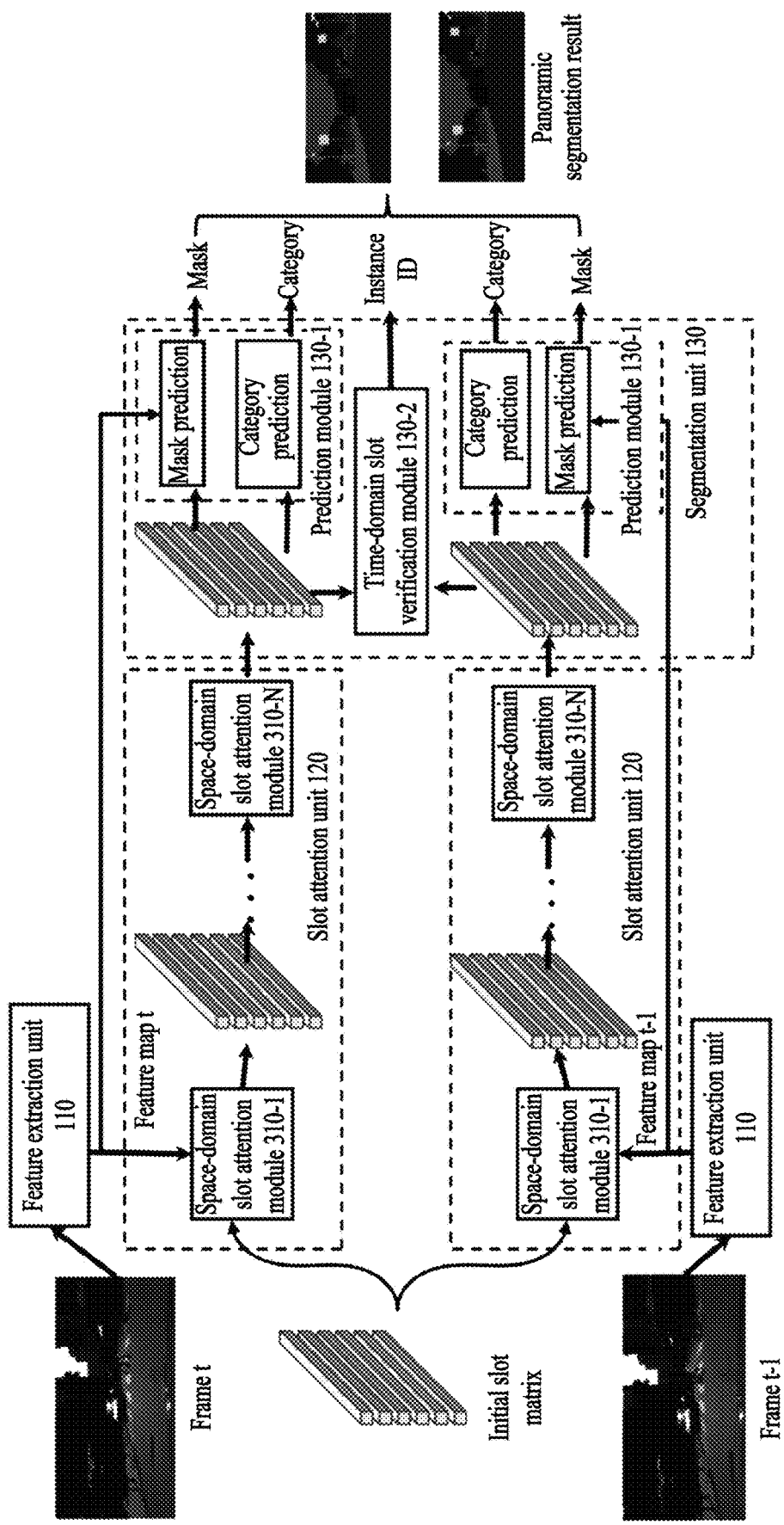
FIG. 3 illustrates an example flow of a slot attention unit of one structure in a segmentation apparatus, according to one or more embodiments.

FIG. 3 illustrates an example flow of the slot attention unit 120 of one structure in the segmentation apparatus 100, according to one or more embodiments.

As shown in FIG. 3, the feature extraction unit 110 may process a current frame t of a video to extract a feature map t of the frame t.

In FIG. 3, the slot attention unit 120 may include one or more cascaded space-domain slot attention modules 310-1 to 310-N. The slot attention unit 120 may perform intra-frame refinement by associating an initial slot matrix corresponding to the frame t multiple times based on the feature map t of the frame t. In this case, the intra-frame refinement may be used to obtain feature information (e.g., position information, appearance information, etc.) of an object in the frame t from the feature map t of the frame t, and the obtained feature information may be used to refine an input slot matrix and determine slot vectors corresponding to different panorama objects in the input slot matrix.

As shown in FIG. 3, the space-domain slot attention modules 310-1 to 310-N may be connected in series to be associated stepwise. An input to each space-domain slot attention module may be an initial slot matrix corresponding to the frame t or a slot matrix output from a previous space-domain slot attention module.

An output slot matrix of the last space-domain slot attention module 310-N may be provided to the segmentation unit 130 for prediction.

As shown in FIG. 3, the segmentation unit 130 may include a prediction module 130-1 and a time-domain slot verification module 130-2.

The prediction module 130-1 may predict a mask and a category of each object in a current frame based on a slot matrix of the current frame. The prediction module 130-1 may also predict a mask and a category of each object in a history frame based on a slot matrix of the history frame. For example, the prediction module 130-1 may include a mask predictor and a category predictor. The mask predictor may determine (predict) a mask of an object in a frame based on a slot matrix input to the segmentation unit 130 and a feature map (e.g., the feature map t of FIG. 3) of the frame (e.g., the frame t of FIG. 3) corresponding to the input slot matrix. The category predictor may determine (predict) a category of an object in a frame (e.g., the frame t of FIG. 3) corresponding to a slot matrix input to the segmentation unit 130 based on the input slot matrix.

The time-domain slot verification module 130-2 may determine an instance ID based on at least two input slot matrices (e.g., the feature map t and the feature map t−1 of FIG. 3). For example, the time-domain slot verification module 130-2 may obtain a similarity measurement between at least two frames (e.g., the frame t and the frame t−1 of FIG. 3) respectively corresponding to the at least two slot matrices. The time-domain slot verification module 130-2 may set a slot vector correspondence relationship between the at least two frames and assign an instance ID, based on the obtained similarity measurement. In an example, the same instance ID may be assigned to slot vectors corresponding to the same object.

Although a panoramic segmentation process for two frames (e.g., the frame t and the frame t−1) is illustrated in FIG. 3, the example of FIG. 3 is provided only for assisting in understanding, and it should be understood that the segmentation apparatus 100 may perform a panoramic segmentation process in a frame unit (i.e., a process performed by inputting a single frame at one time) or perform the panoramic segmentation process on multiple frames in a batch unit simultaneously.

For example, when the segmentation apparatus 100 performs the panoramic segmentation process in a frame unit (e.g., the panoramic segmentation process on a frame t), the panoramic segmentation process may be completed for a plurality of previous frames (e.g., a frame t−1, a frame t−2, . . . , etc.) before the frame t, and results therefrom (e.g., final output slot matrices of the frame t−1, the frame t−2, . . . etc., i.e., slot matrices output from a last space-domain slot attention module) may be stored in a storage device of the segmentation apparatus 100. That is, in this case, operations performed on the frame t−1 by the feature extraction unit 110, the slot attention unit 120, and the category predictor and the mask predictor of the prediction module 130-1 of the segmentation unit 130 shown in FIG. 3 may be completed when the frame t−1 is actually a current frame (i.e., before the process is performed on the frame t), and results therefrom may be already stored in the storage device of the segmentation apparatus 100 before the process on the frame t is started. Accordingly, when instance ID prediction is performed on the frame t, the time-domain slot verification module 130-2 may predict an instance ID of an object in the frame t using a final output slot matrix of the frame t and the stored final output slot matrices of the frame(s) previous to the frame t.

For another example, when the segmentation apparatus 100 simultaneously performs the panoramic segmentation process on a plurality of frames (e.g., the frame t, the frame t−1, the frame t−2, . . . etc.), the operation of extracting a feature map and the operation of associating the feature map with a slot matrix, which are described above, may be performed on the frames simultaneously. Accordingly, the time-domain slot verification module 130-2 may predict an instance ID of an object of a specific frame using a final output slot matrix of the frame among the frames and final output slot matrices of frames before and/or after the specific frame.

In addition, although the panoramic segmentation process performed on a plurality of consecutive frames has been described in detail above with reference to FIG. 3, the segmentation apparatus 100 may also be applicable to segmentation of a single image, for example, segmentation of a frame t without segmentation of a frame t−1. In this case, only the upper half portion of what is illustrated in FIG. 3 may be used. In this case, the segmentation unit 130 may predict only a category and a mask of an object included in the single image without predicting an instance ID.

Figure 4:
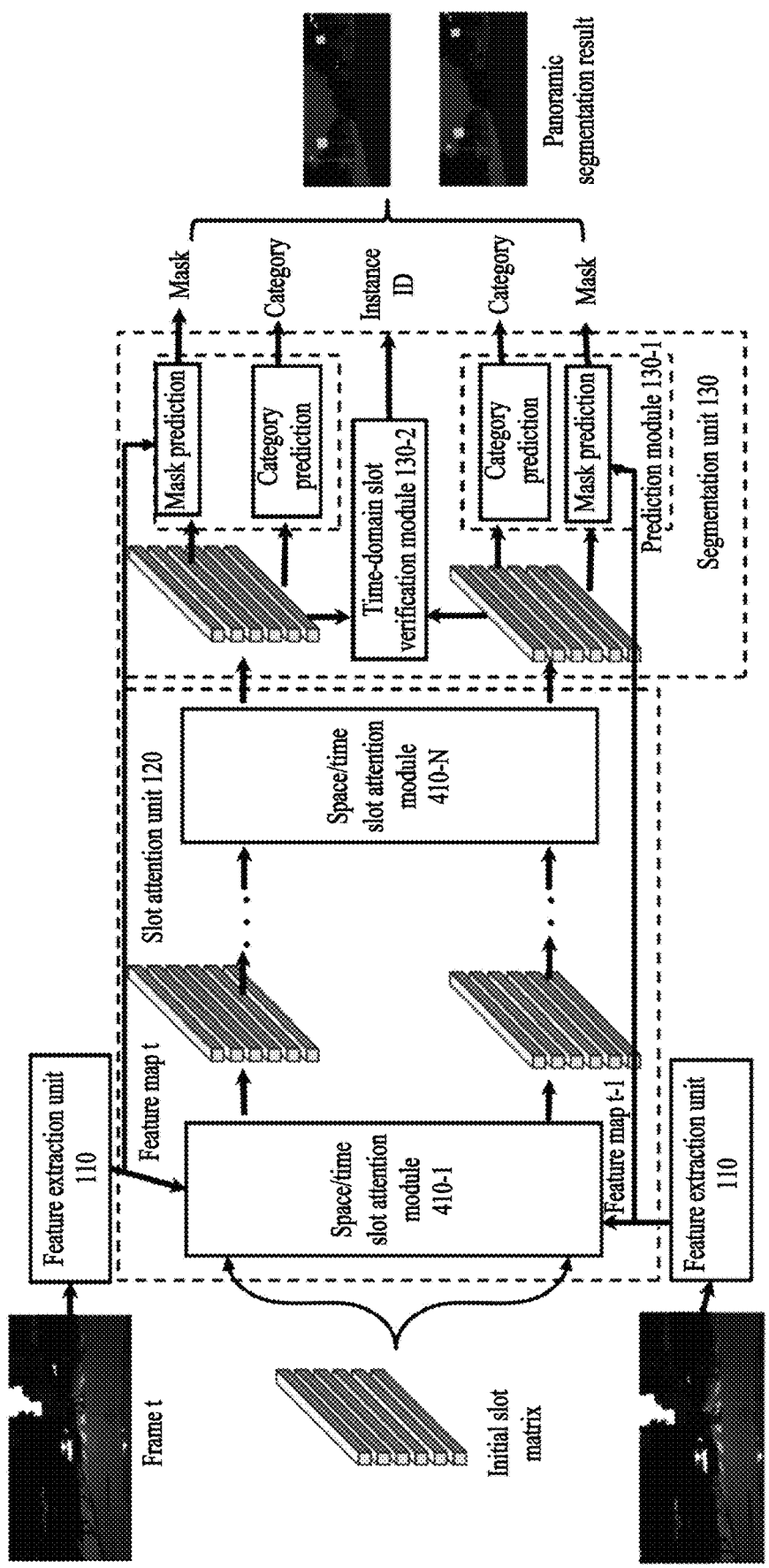
FIG. 4 illustrates an example flow of a slot attention unit of another structure in a segmentation apparatus, according to one or more embodiments.

FIG. 4 illustrates an example flow of the slot attention unit 120 of another structure (e.g., a second structure) in the segmentation apparatus 100, according to one or more embodiments.

In FIG. 4, the operations of the feature extraction unit 110 and the segmentation unit 130 of FIG. 4 are the same as those described above with reference to FIG. 3, and thus will not be further described hereinafter.

Referring to FIG. 4, the slot attention unit 120 may include one or more cascaded space/time slot attention modules 410-1 to 410-N. The one or more cascaded space/time slot attention modules 410-1 to 410-N may implement an intra-frame refinement process and an inter-frame refinement process by performing multi-association on an initial slot matrix corresponding to a frame t based on a feature map of the frame t and a frame t−1. In this case, as shown in FIG. 4, an input to each of the space/time slot attention modules 410-1 to 410-N may be the initial slot matrix corresponding to the frame t or a slot matrix output from a previous space/time slot attention module. For another example, an input to each space/time slot attention module may be an initial slot matrix corresponding to the frame t−1 or a slot matrix output from a previous space/time slot attention module. In addition, the inter-frame refinement process may be used to establish an association between an object of a current frame and an object of at least one previous frame of the current frame. Hereinafter, a time-domain slot attention module will be described in detail with reference to FIG. 5.

The space/time slot attention modules 410-1 to 410-N may generate a space/time consistent slot using, as an input, a multi-scale feature (e.g., a feature map) and a slot. In an example, the multi-scale feature (e.g., the feature map) may further include a position embedded map. The space/time slot attention modules 410-1 to 410-N may be repeated N times such that an input slot is able to completely obtain object information in a space/time domain. Through processing of the space/time slot attention modules 410-1 to 410-N, an output slot may provide information for directly predicting a category, a mask, and an ID of a panorama object in a video. The space/time slot attention modules 410-1 to 410-N may each include two modules: a space-domain slot attention module and a time-domain slot attention module.

The sequential invocation of a plurality of time-domain slot attention modules is described with pseudo code as follows.

---
Input: $S^0 \in R^{L*C}$, P, $X_t$, $X_{t-1} \in R^{D*C}$
Steps:
$S_{t,0} = S^0$, $S_{t-1,0} = S^0$
for n = 1, ..., N
$\quad SP_{t-1,n} = PR_n(S_{t-1,n-1}, P, sel_n(X_{t-1}))$
$\quad SP_{t,n} = PR_n(S_{t,n-1}, P, sel_n(X_t))$
$\quad S_{t,n}, S_{t-1,n} = VR_n(SP_{t,n}, SP_{t-1,n})$
$\quad$ return $S_{t,N}, S_{t-1,N}$

---

In this case, PR represents the space-domain slot attention module and VR represents the time-domain slot attention module, and $sel_n(X)$ represents a feature map for selecting a scale from a multi-scale feature X. For example, $sel_n(X_t)$ represents a feature map for selecting a scale from a multi-scale feature map $X_t$ corresponding to a current frame for step n. Here, N is an integer greater than or equal to 1. C represents the number of channels of a feature map (i.e., a channel dimension) or the number of channels of a slot vector (i.e., a channel dimension). L represents a maximum number of slot vectors, i.e., a slot dimension. D represents a space dimension, and P represents position information. In addition, an nth space/time slot attention module may use a feature map of a highest resolution, and a resolution of a feature map used in a previous space/time slot attention module may not exceed a resolution of a subsequent module. For each step n, a space-domain slot attention module $PR_n$ may associate an input current slot matrix ($S_{t, n-1}$) and a previous slot matrix ($S_{t-1, n-1}$) with a space-domain feature of each frame to generate associated slot matrices $SP_{t, n}$ and $S_{t-1, n}$. In this process, the space-domain slot attention module may retrieve and encode object information and inject it into a slot. Subsequently, the time-domain slot attention module $VR_n$ may obtain an output slot extended to a time domain, for example, $S_{t,n}$ and $S_{t-1,n}$, using a result obtained from the space-domain slot attention module of all frames. In this case, related object information of another frame may be retrieved, and this object information may be used to refine or supplement a slot of the current frame. A result of the process may be transmitted to a subsequent space/time slot attention module for iterative refinement. The slot matrices $S_{t, 0}$ and $S_{t-1,0}$ may all be $S^0$ and be the same. Although the foregoing pseudo code and the block diagram use two frames as an example, the space/time slot attention module may process three or more frames.

Although not explicitly shown in FIGS. 3 and 4, feature maps used in respective slot attention modules in FIGS. 3 and 4 may have different scales. For example, a last space/time slot attention unit may use a feature map of a highest resolution, and a resolution of a feature map used in a previous space/time slot attention module block may not exceed a resolution of a subsequent space/time slot attention module.

Figure 5:
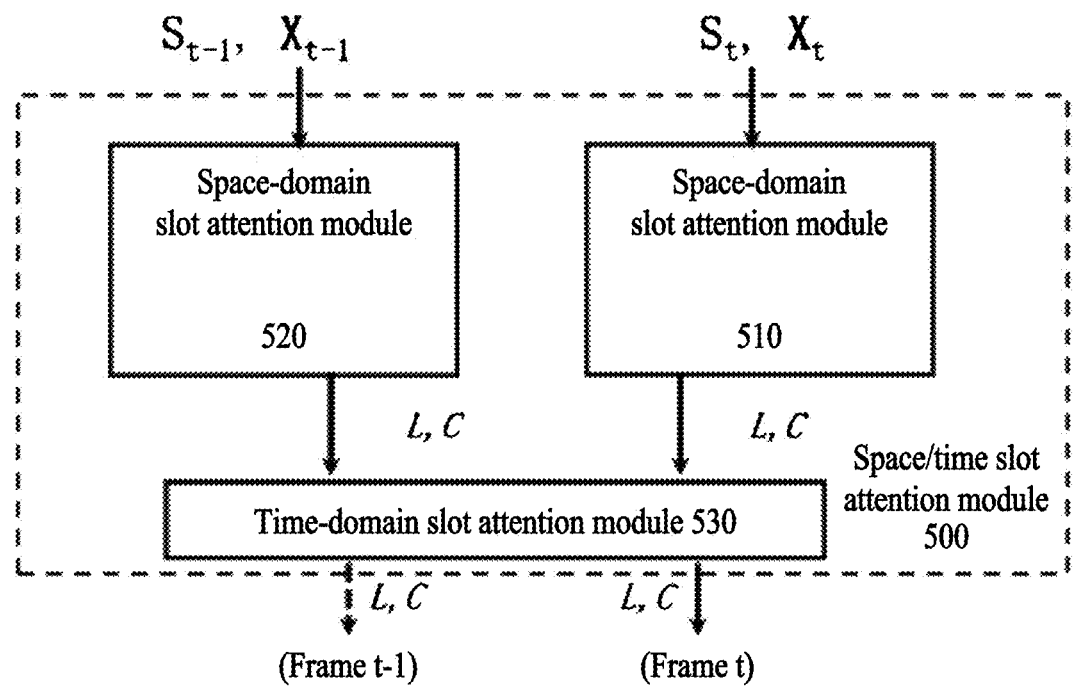
FIG. 5 illustrates an example structure of a space/time slot attention module, according to one or more embodiments.

FIG. 5 illustrates an example structure of a space/time slot attention module.

Referring to FIG. 5, a space/time slot attention module 500 may include a first space-domain slot attention module 510, a second space-domain slot attention module 520, and a time-domain slot attention module 530. The time-domain slot attention module 530 may be coupled to the first space-domain slot attention module 510 and the second space-domain slot attention module 520. The first space-domain slot attention module 510 and the second space-domain slot attention module 520 may be, selectively, the same space-domain slot attention module or may use the same space-domain slot attention module.

In FIG. 5, $S_{t-1}$ and $X_{t-1}$ may be, respectively, a slot matrix and a feature map corresponding to a frame t−1. In addition, $S_t$ and $X_t$ may be, respectively, a slot matrix and a feature map corresponding to a frame t.

The first space-domain slot attention module 510 may implement an intra-frame refinement process by associating the slot matrix $S_t$ corresponding to the input frame t, based on the feature map $X_t$ of the frame t. The second space-domain slot attention module 520 may implement the intra-frame refinement process by associating the slot matrix $S_{t-1}$ corresponding to the input frame t−1, based on the feature map $X_{t-1}$ of the frame t−1.

The time-domain slot attention module 530 may perform the intra-frame refinement process by associating a slot matrix output from the first space-domain slot attention module 510 with a slot matrix output from the second space-domain slot attention module 520. In addition, the time-domain slot attention module 530 may output an associated slot matrix corresponding to the frame t and an associated slot matrix corresponding to the frame t−1, respectively, to a first space-domain slot attention module and a second space-domain slot attention module of a subsequent space/time slot attention module, or to the segmentation unit 130.

The structure of the space/time slot attention module 500 shown in FIG. 5 is an example only. For example, although it is shown in FIG. 5 that the time-domain slot attention module 530 outputs both the slot matrix corresponding to the frame t and the slot matrix corresponding to the frame t−1, the time-domain slot attention module 530 may output only the slot matrix corresponding to the frame t.

For another example, the space/time slot attention module 500 may include only one space-domain slot attention module. In this example, the space/time slot attention module 500 may include the space-domain slot attention module 510 and the time-domain slot attention module 530 but may not include the space-domain slot attention module 520. In this case, similar to what has been described above with reference to FIG. 3, the segmentation apparatus 100 may perform a panoramic segmentation process by frame units (that is, one frame is input and processed at a time), and perform the panoramic segmentation process on multiple frames in a batch unit simultaneously.

For example, when the segmentation apparatus 100 performs the panoramic segmentation process in a frame unit (e.g., the panoramic segmentation process on a frame t), the panoramic segmentation process may have been completed for a plurality of previous frames before the frame t (e.g., a frame t−1, a frame t−2, . . . , etc.) and results therefrom (e.g., final output slot matrices of the frame t−1, the frame t−2, . . . , etc.) may be stored in a storage device of the segmentation apparatus 100. That is, an operation performed on the frame t−1 by the space-domain slot attention module 520 shown in FIG. 5 may be completed when the frame t−1 is a current frame (that is, before the process for the frame t is completed), and a result therefrom may be already stored. Thus, to process the frame t, the time-domain slot attention module 530 may perform an inter-frame refinement process on a slot matrix received from the space-domain slot attention module 510, based on a result of an inter-frame refinement process between previous frames of slot matrices corresponding to at least one previous frame of the current frame to which the space/time slot attention module belongs (that is, a result of processing a slot matrix of the time-domain slot attention module 530 for the frame t−1), and output a result of the process to a subsequent space/time slot attention module or the segmentation unit 130.

For another example, the segmentation apparatus 100 may perform the panoramic segmentation process on a plurality of frames simultaneously. For example, the segmentation apparatus 100 may simultaneously perform the panoramic segmentation process on the frame t, the frame t−1, the frame t−2, . . . , etc. The time-domain slot attention module 530 may perform an inter-frame refinement process between previous frames on a slot matrix corresponding to at least one previous frame of a current frame that is received from the space-domain slot attention module 510, based on a result of the intra-frame refinement process between previous frames on a slot matrix corresponding to the at least one previous frame of the current frame, and may output a result of the process to a subsequent space/time slot attention module or to the segmentation unit 130.

In addition, the space/time slot attention module 500 may further include a greater number of space-domain slot attention modules. For example, the space/time slot attention module may further include a plurality of space-domain slot attention modules respectively corresponding to a plurality of frames including the current frame. In this example, the time-domain slot attention module 530 may perform the inter-frame refinement process on slot matrices output from the space-domain slot attention modules, and may output a slot matrix obtained through the inter-frame refinement process to a corresponding plurality of space-domain slot attention modules among subsequent space/time slot attention modules or to the segmentation unit 130.

Hereinafter, an example structure of a space-domain slot attention module and an example structure of a time-domain slot attention module and corresponding operation flows thereof will be described in detail with reference to FIGS. 6 to 9.

Figure 6:
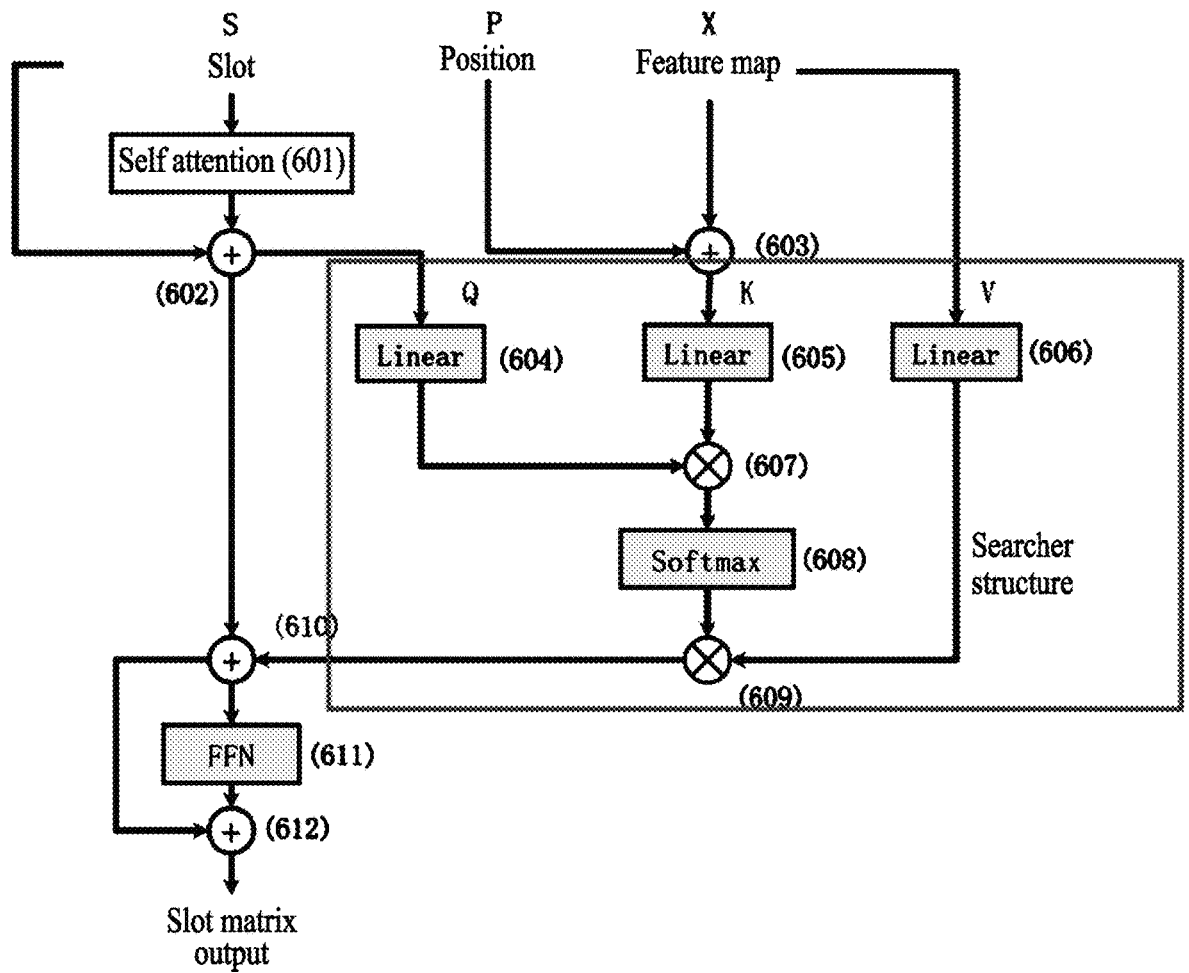
FIG. 6 illustrates an example structure of a space-domain slot attention module and an example flow of corresponding operations thereof, according to one or more embodiments.

FIG. 6 illustrates an example structure of a space-domain slot attention module and an example flow of corresponding operations thereof, according to one or more embodiments.

As shown in FIG. 6, an input to a space-domain slot attention module may include a slot matrix S, a feature map X, and position information P. The slot matrix S may be an initial slot matrix or a slot matrix output from a previous space-domain slot attention module. In addition, the feature map X may be a feature map extracted by the feature extraction module 110. The position information P may indicate a position of each pixel in a frame. Further, an output of the structure shown in FIG. 6 may also be a slot matrix (i.e., a refined slot matrix). Although the position information P is illustrated as a separate input in FIG. 6, the position information P may also be included in the feature map X such that an input feature map X includes a position embedded map P. In this case, the position embedded map P may be automatically generated according to an image size (e.g., a width and a length) without depending on image information.

Referring to FIG. 6, in step 601, a self-attention module may extract an autocorrelation feature of an input slot matrix S. In this case, the self-attention module may be implemented using various well-known self-attention models. In step 602, the extracted autocorrelation feature may be added to the input slot matrix S elementwise. In step 604, a linear operation may be performed on a slot matrix resulting from step 602. Also, in step 603, the position information P may be added to the feature map X elementwise. In step 605, a linear operation may be performed on a slot matrix resulting from step 603. Also, in step 606, a linear operation may be performed on the input feature map X.

In step 607, a matrix multiplication operation may be performed on an output slot matrix of step 604 and an output map of step 605. In step 608, a softmax operation may be performed on a result from step 607 to transform a result from step 607 into a probability. The softmax operation is performed on a slot dimension L, not on a space dimension D. This may allow different home vectors to compete such that final panorama object masks are separated from each other (i.e., mask areas of different panorama objects do not overlap). Subsequently, in step 609, a matrix multiplication may be performed on the result from step 608 and the result from step 606, and a result therefrom may be transformed into the form of a slot matrix. In step 610, a slot matrix resulting from step 609 may be added, elementwise, to the slot matrix resulting from step 602. In step 611, a feed-forward network (FFN) operation may be performed on the result slot matrix of step 610. In step 612, a result slot matrix of step 611 may be added, elementwise, to the result slot matrix of step 610, and an output slot matrix of a corresponding space-domain slot attention module may be obtained.

The steps described above with reference to FIG. 6 may be represented by the following equations.

$S'_{t,n} = S_{t,n-1} + SA(S_{t,n-1})$ (corresponding to steps 601 and 602, and SA denotes the self-attention module)

$S''_{t,n} = S'_{t,n} + RE(S'_{t,n}, X_t + P, X_t)$ (corresponding to steps 603 to 610)

$SP_{t,n} = S''_{t,n} + FFN(S''_{t,n})$ (corresponding to steps 611 and 612)

In the equations above, RE( ) denotes a searcher operation, and its general structure may be represented as shown in a box in FIG. 6, and three inputs are Q, K, and V. $S_{t,n-1}$ denotes a slot matrix input from a previous slot attention module (e.g., a space-domain slot attention module or a space/time slot attention module). In this case, it is assumed that n denotes a current one and n−1 denotes a previous one. SA( ) denotes a self-attention operation, and FFN( ) denotes an FFN operation. These two operations are known and description thereof may be found elsewhere. In addition, $SP_{t,n}$ denotes a final output of a current space-domain slot attention module.

In a space-domain slot attention module shown in FIG. 6, in step 601, an input of the self-attention module may be $SA(S_{t,n-1})$, $Q=S'_{t,n-1}$ (result of step 602), $K=X_t+P$ (result of step 603), $V=X_t$. In the space-domain slot attention module, a searcher (see FIG. 7) may retrieve object information (e.g., position, appearance, etc.) from a space-domain feature and may associate a slot matrix with each pixel of the space-domain feature during a specific operation. A position embedded map may be added to the space-domain feature to improve position information. In addition, a slot competition mechanism of the searcher (i.e., softmax of the searcher may occur in dimension L of a slot matrix) may allow different slot vectors to be mutually exclusive to each other in order to correspond to separate panorama objects.

In addition, although not shown in the drawing, a layer normalization operation may be performed after an elementwise addition operation, and the normalization operation may be selected after a matrix multiplication operation. In addition, a linear operation may be performed after a non-linear activation operation, and the linear operation may include one or more linear transformations. Such normalization and activation operations are known and description thereof may be found elsewhere.

Figure 7:
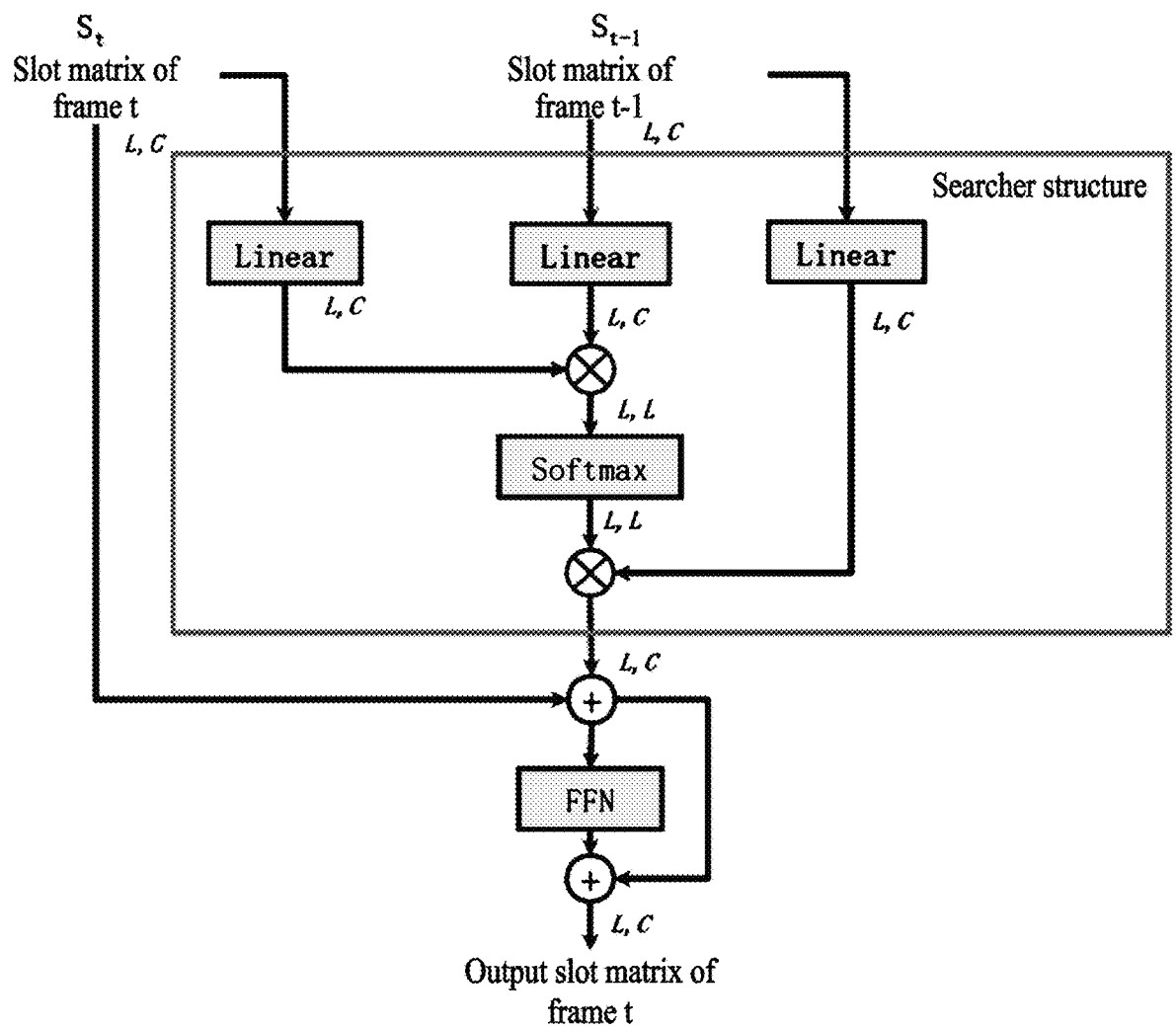
FIG. 7 illustrates an example structure of a time-domain slot attention module, according to one or more embodiments.
Figure 8:
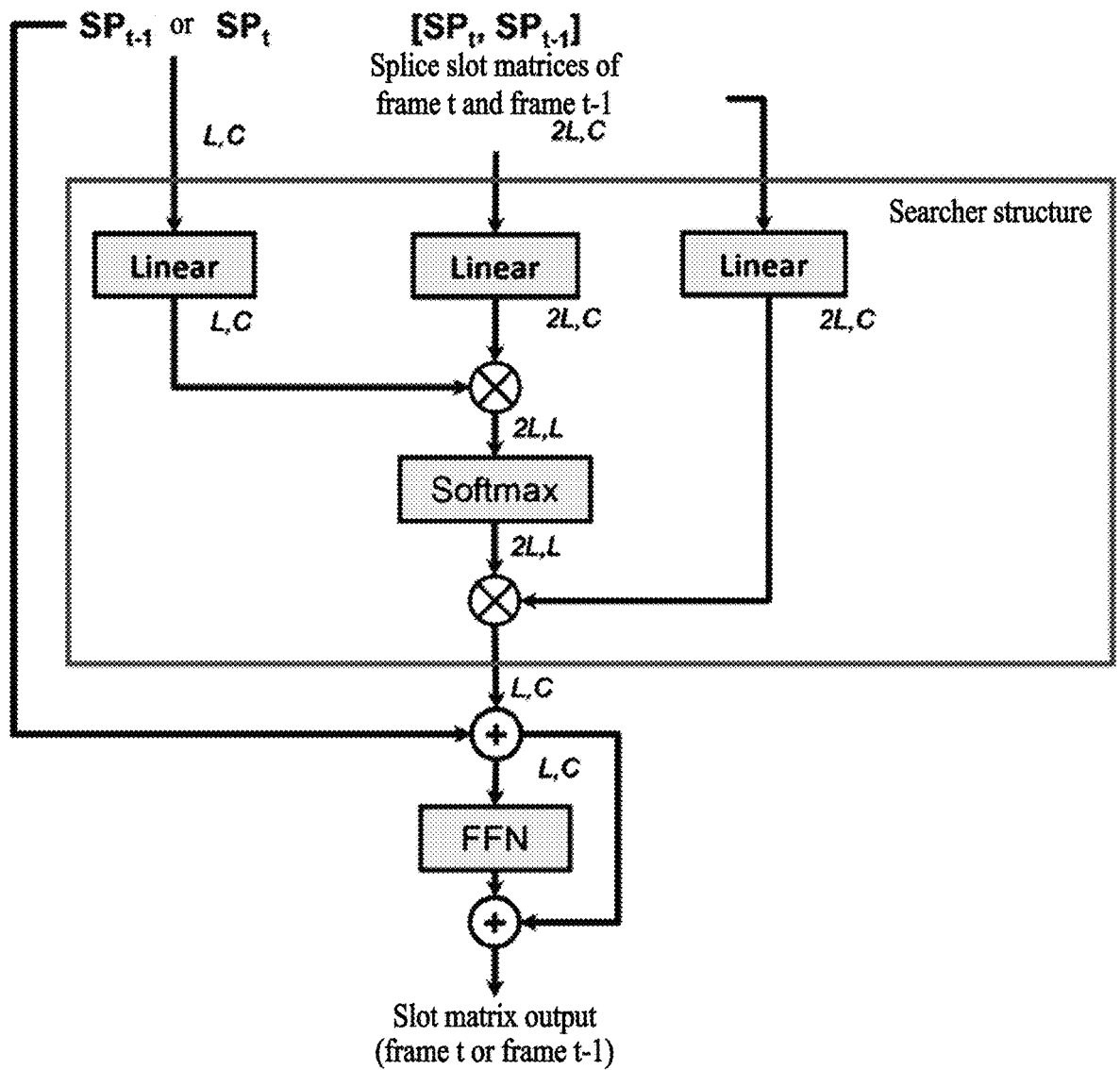
FIG. 8 illustrates an example structure of a time-domain slot attention module, according to one or more embodiments.
Figure 9:
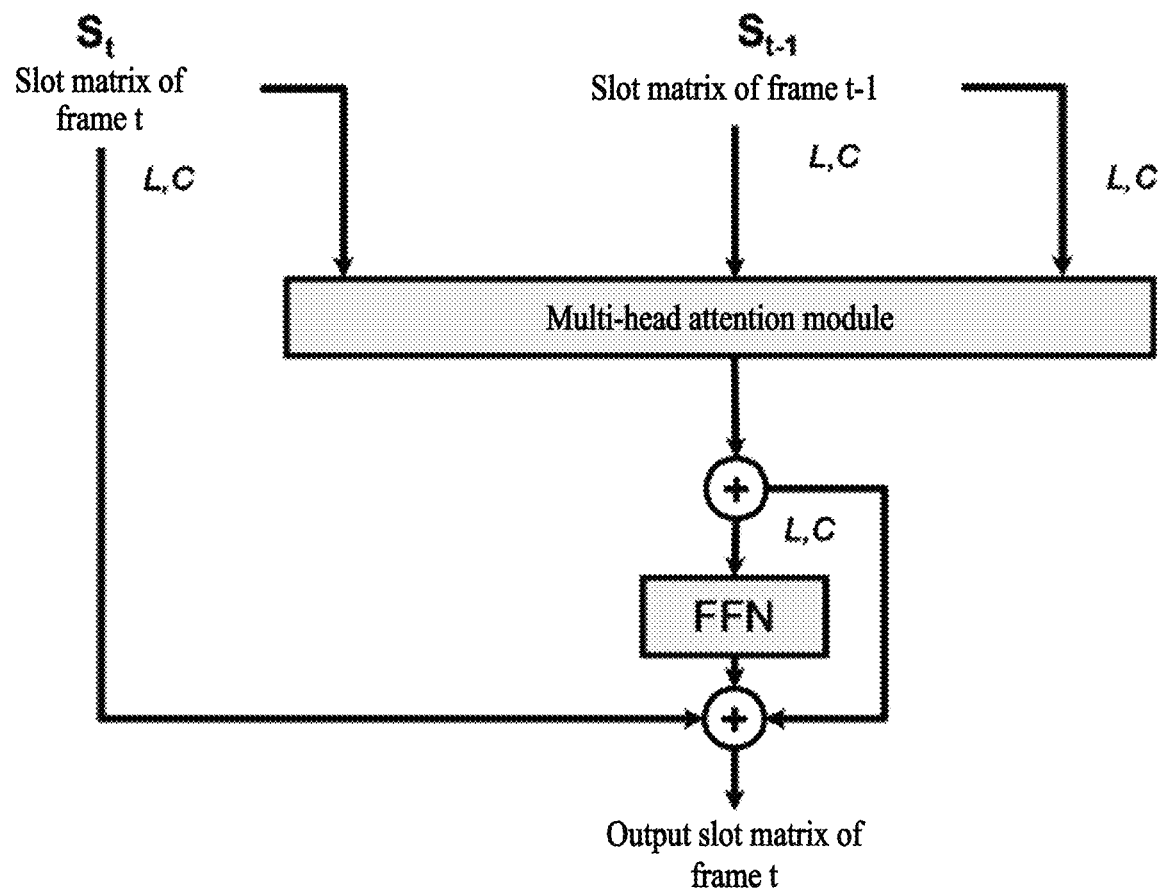
FIG. 9 illustrates an example flow of operations of a time-domain slot attention module, according to one or more embodiments.

FIGS. 7 through 9 illustrate example structure of a time-domain slot attention module and an example flow of corresponding operations thereof. A time-domain slot attention module may refine a slot matrix through time-domain information of an object, the goal of which may be to establish a correlation between objects of different frames and assist in the refinement of slot matrices of different frames corresponding to the same object using information of different frames. This may allow the slot matrices of the different frames corresponding to the same object to be as consistent as possible.

FIGS. 7 to 9 illustrate, respectively, three structures of the time-domain slot attention module, according to one or more embodiments. The structure shown in FIG. 7 may include components such as linear transformations (represented by lines), a softmax operation, a matrix multiplication operation, an elementwise addition operation, and an FFN operation. The structure shown in FIG. 8 may use, as an input, a combined slot matrix obtained by splicing slot matrices of a frame t and a frame t−1, and an output thereof may be a complex slot matrix, with other components being the same as those shown in FIG. 7. In FIG. 8, refined slot matrices for the frame t and the frame t−1 may be obtained by segmenting the output complex slot matrix. A detailed operation of each component shown in the drawings has been described above with reference to the drawings or is known, and thus a more detailed description thereof is omitted.

The steps shown in FIG. 8 may be represented by the following equations.

$VR_{t,n} = SP_{t,n} + RE(SP_{t,n}, [SP_{t,n}, SP_{t-1,n}], [SP_{t,n}, SP_{t-1,n}])$ $S_{t,n} = VR_{t,n} + FFN(VR_{t,n})$ $VR_{t-1,n} = SP_{t-1,n} + RE(SP_{t-1,n}, [SP_{t,n}, SP_{t-1,n}], [SP_{t,n}, SP_{t-1,n}])$ $S_{t-1,n} = VR_{t-1,n} + FFN(VR_{t-1,n})$

In the equations above, $SP_{t,n}$ and $SP_{t-1,n}$ represent outputs of a space-domain slot attention module connected to a corresponding time-domain slot attention module, for example, an output slot matrix of the frame t and an output slot matrix of the frame t−1. $[SP_{t,n}, SP_{t-1,n}]$ indicates that $SP_{t,n}$ and $SP_{t-1,n}$ are spliced. Although two frames are described here as being spliced, it should be noted that the splicing operation may be performed on a greater number of frames and a time-domain slot attention easily extends to two or more frames. $S_{t,n}$ and $S_{t-1,n}$ are final outputs of a current time-domain slot attention module. For example, $S_{t,n}$ and $S_{t-1,n}$ may be an output slot matrix of the frame t and an output slot matrix of the frame t−1.

In an example, a space-domain slot attention module and a time-domain slot attention module may each use a searcher. Such searchers may have the same structure or may have different functions amongst them, depending on an input. A role of the searcher in the time-domain slot attention module may be mainly to assist in the establishment of a sole connection (identity correspondence) of objects between frames through a slot competition mechanism, thereby assisting a time-domain slot verification module (e.g., the time-domain slot verification module 130-2) in completing a function of predicting an instance ID. In this example, due to the use of inter-frame information of the time-domain slot attention module, the time-domain slot verification module may complete the prediction of an instance ID based only on the received refined slot matrix without depending on other information (e.g., feature map, object bounding box, object mask, etc.). In addition, the time-domain slot attention module may easily extend to processing a plurality of frames.

The structure of the searcher may be configured to retrieve related information from slots and other information, and the other information may include a feature map (used for the space-domain slot attention module) or a slot of another frame (used for the time-domain slot attention module). Unlike an existing dot product attention, a slot competition mechanism may be applied to the searcher, which may satisfy an operational requirement for entire video segmentation. That is, each object may be separated (identified) from another object in both the space domain and the time domain. The slot competition mechanism may effectively prevent multiple slots from competing for the same panorama object and may encourage or bias one slot vector to correspond to one object.

In addition, actual corresponding inputs Q, K, and V of the searcher in the space-domain slot attention or the time-domain slot attention are shown in combination with the three foregoing structural diagrams. A general function of the searcher may be divided into three steps: information transformation, correlation computation, and related information detection. The information transformation may be implemented by the three linear operations 604, 605, and 606 shown in FIG. 6, for example. The correlation computation may include a correlation matrix and a slot-dimension softmax operation, through the matrix multiplication 607 of FIG. 6, for example. When an information correlation between a specific slot vector of Q and a specific position of K is high, a value of a corresponding position on the correlation matrix may be large. The softmax operation may correspond to step 608 of FIG. 6, for example, and may implement slot competition. The related information detection may detect related information by multiplying V by the correlation matrix after the softmax operation 608 through the matrix multiplication 609 of FIG. 6, for example.

In addition, the structure shown in FIG. 9 may use a multi-head attention module. In FIG. 8, the self-attention module may be used to refine a slot matrix before associating a slot and a feature, and the FFN module may be used to refine a slot matrix after associating a slot and a feature. The association may be implemented by the searcher. The structure of the searcher is illustrated in FIGS. 5 to 7, and thus will not be described further for conciseness.

Through the space-domain slot attention module and the time-domain slot attention module, a slot matrix may include object information of each frame, and slot vectors corresponding to the same object in different frames may be highly consistent. Therefore, only some specific operations that depend on an FFN may complete a prediction function. The FFN may typically include two linear operation layers but may also include a greater or smaller number of linear operation layers.

Figure 10A:
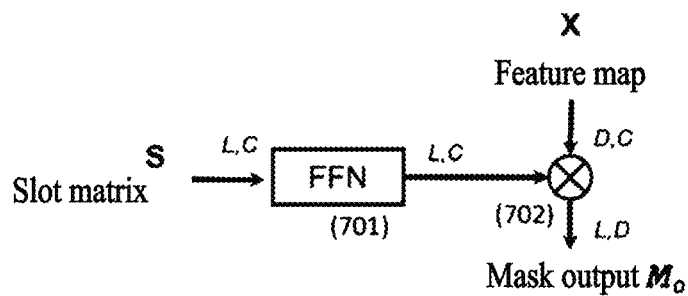
FIG. 10A illustrates an example structure of the mask predictor, according to one or more embodiments.

FIGS. 10A through 10O illustrate example structures of the mask predictor, the category predictor, and the time-domain slot verification module 130-2, and example flows of corresponding operations thereof.

FIG. 10A illustrates an example structure of the mask predictor. The mask predictor may include an FFN layer 701 and a matrix multiplier 702. The FFN layer 701 may output a result of a slot matrix S by performing an FFN operation on the slot matrix S. The matrix multiplier 702 may perform a matrix multiplication operation on (i) the result thereof and (ii) a feature map X of a frame corresponding to the slot matrix S, to output a mask output $M_O$. The mask output $M_O$ may be a mask of each object in the frame.

In an example, although an output of an FFN layer is described as included in a mask prediction step of the mask predictor, the output of the FFN layer may be used as an input to a subsequent module. That is, an output of a space/time slot attention module or a space-domain slot attention module may pass through the FFN layer to be input to a subsequent space/time slot attention module or a subsequent space-domain slot attention module.

Figure 10B:
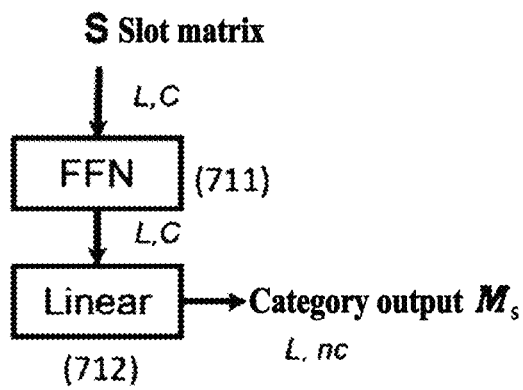
FIG. 10B illustrates an example structure of a category predictor, according to one or more embodiments.
Figure 10C:
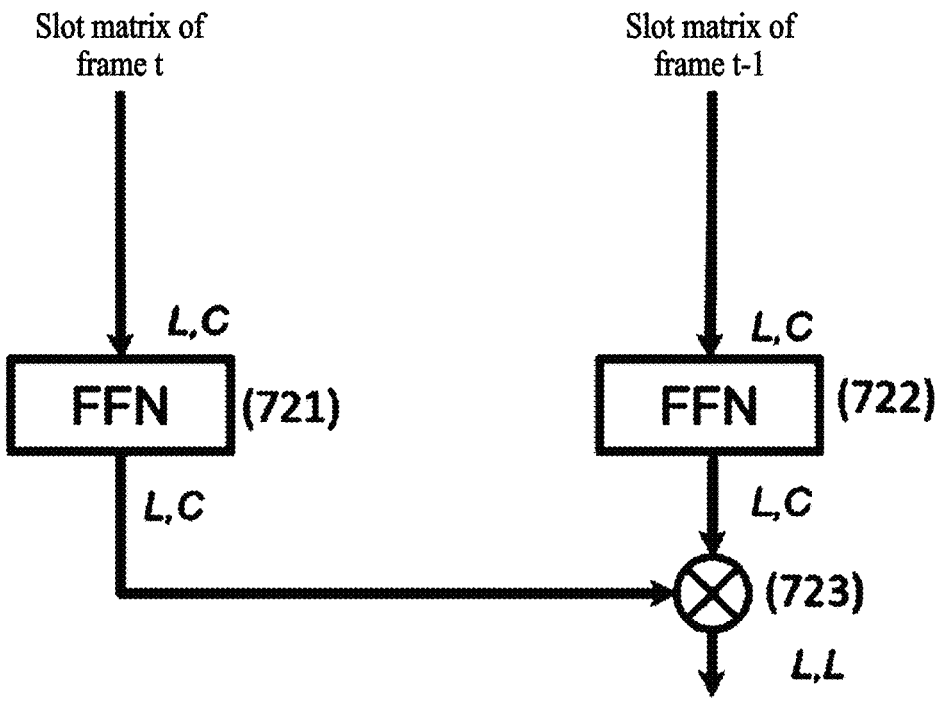

FIG. 10B illustrates an example structure of the category predictor. The category predictor may obtain a category output $M_S$ by allowing a received slot matrix S to pass through an FFN layer (e.g., step 711) and a linear transformation layer (e.g., step 712). The category output $M_S$ may be a category of each object in a frame.

FIG. 10O illustrates an example structure of the time-domain slot verification module 130-2. The time-domain slot verification module 130-2 may pass an input slot matrix through each FFN layer (e.g., steps 721 and 722), and may then perform a matrix multiplication (e.g., step 723) on a result of two input slot matrices (e.g., a slot matrix of a frame t and a slot matrix of a frame t−1). Through this, a similarity measurement between a slot pair of the frame t and the frame t−1 (including a slot of the frame t and a slot of the frame t−1) may be obtained. A correspondence relationship in a slot vector between the frame t and the frame t−1 may be established based on the obtained similarity measurement. In an example, although the correspondence relationship is established using a binary matching algorithm or the like, examples of the present disclosure are not limited thereto, and any other suitable methods may also be used to establish the correspondence relationship. In addition, the time-domain slot verification module 130-2 may calculate a similarity between slots of different frames to predict an instance ID. A consistent slot may be obtained through a previous slot attention module, and thus the prediction of the time-domain slot verification module 130-2 may be based mainly on a slot itself and may not require a complex fusion operation.

Figure 11:
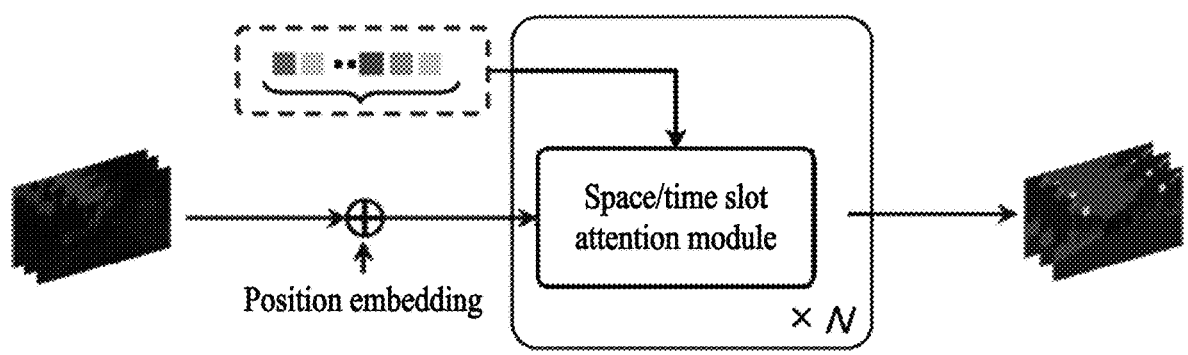
FIG. 11 illustrates an example flow of segmentation performed by a segmentation apparatus, according to one or more embodiments.

FIG. 11 illustrates an example flow of segmentation performed by the segmentation apparatus 100. In FIG. 11, "xN" in a space/time slot attention module indicates that N such units (stages) are arranged stepwise. In addition, the structure and flow shown in FIG. 11 are substantially similar to those shown in FIG. 3 except for the illustrated form of representation.

Figure 12:
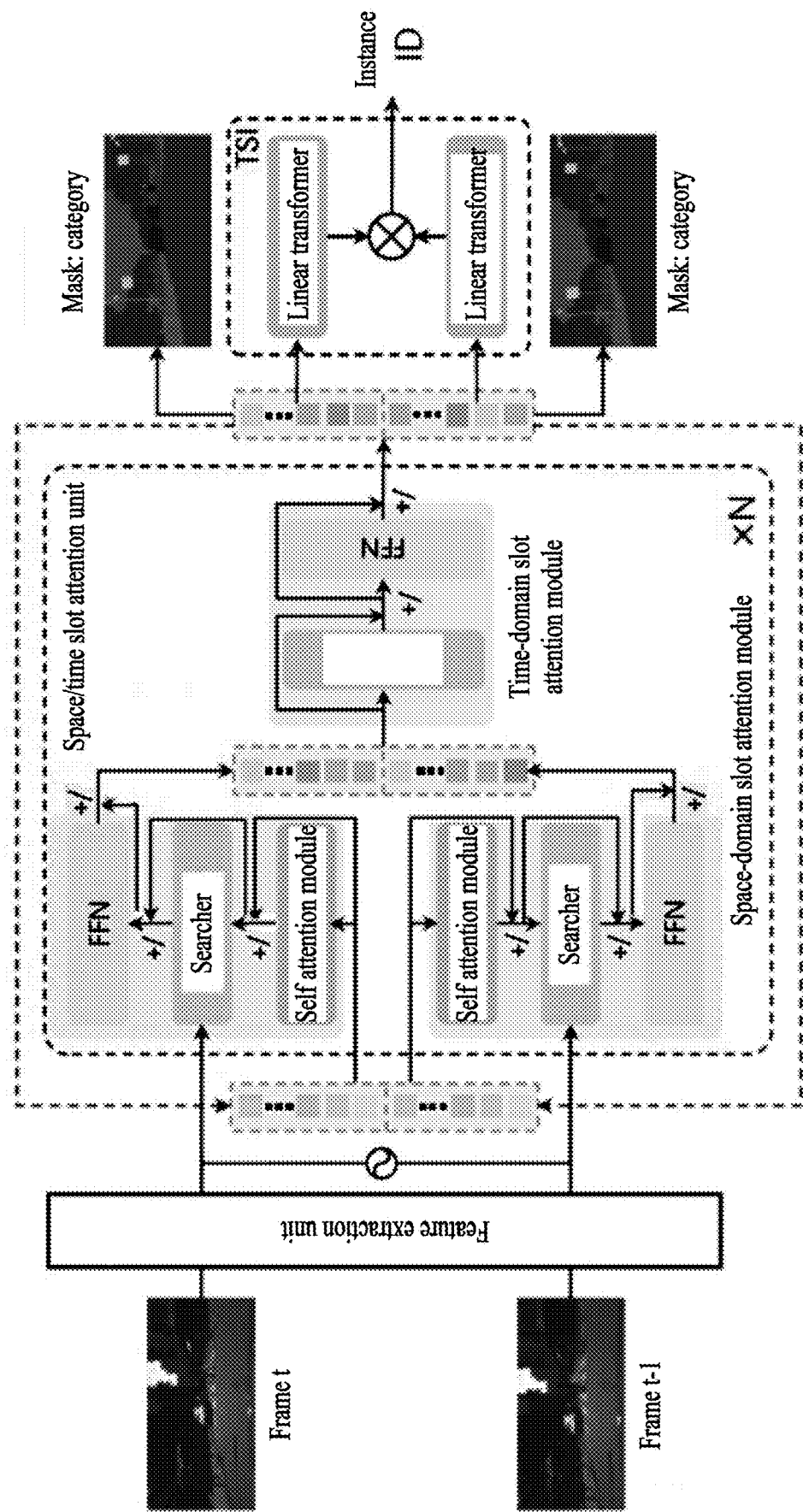
FIG. 12 illustrates an example flow of segmentation performed by a segmentation apparatus, according to one or more embodiments.

FIG. 12 illustrates another example flow of segmentation performed by the segmentation apparatus 100.

Referring to FIG. 12, a temporal slot identification (TSI) module may correspond to the time-domain slot verification module 130-2 described above, and a detailed structure of another module described above will not be described further here for conciseness. In addition, in FIG. 12, "×N" in a time-domain slot attention module indicates that N such modules are arranged stepwise.

It should be noted that the structure and flow shown in FIG. 12 are substantially similar to those shown in FIG. 3, and a difference therebetween is primarily the form of representation.

A network structure of each constituent unit of the segmentation apparatus 100 may determine a corresponding hyperparameter through training of a preset dataset. In addition, loss function(s) used for the training may be a pixel-level cross entropy loss, a panorama object-level panorama quality loss, a mask ID loss and a mask similarity loss, a trace loss used to monitor a slot matrix similarity between two frames, or the like, which are known. Detailed description thereof may be found elsewhere.

Figure 13:
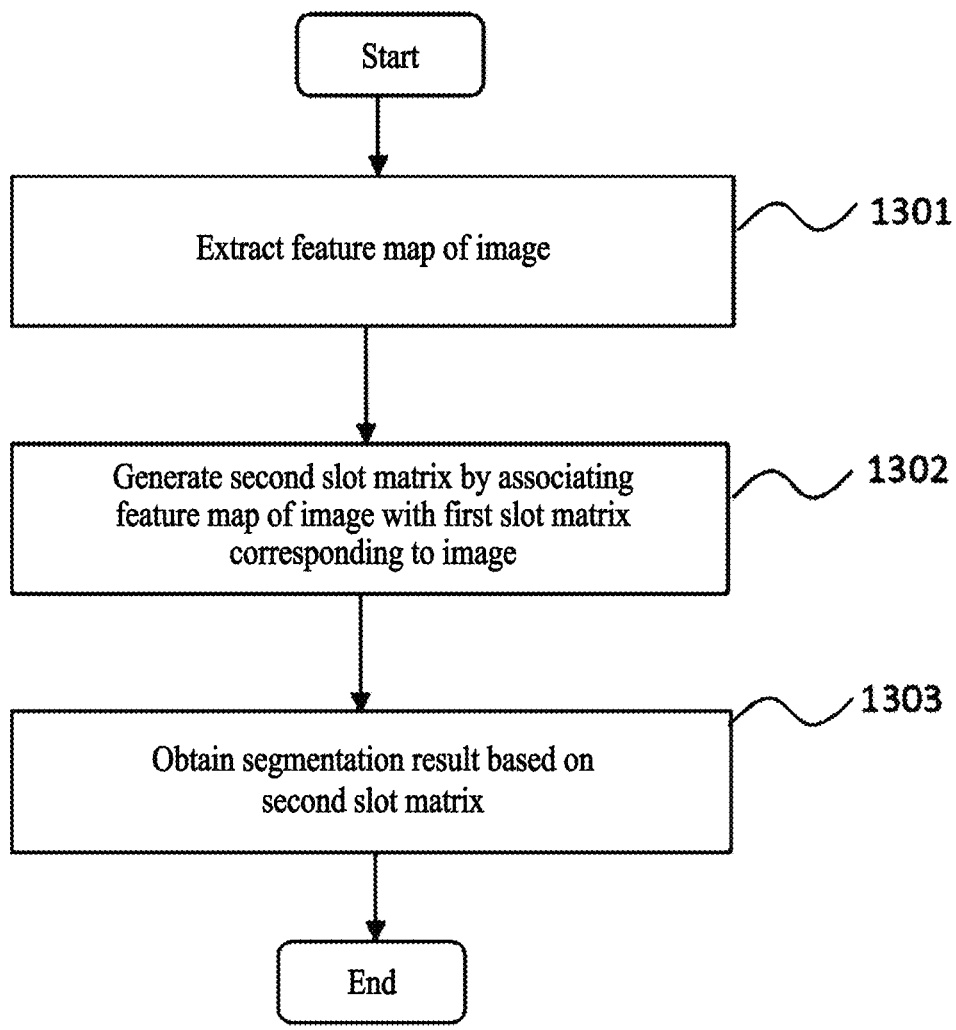
FIG. 13 illustrates an example of a segmentation method, according to one or more embodiments.

FIG. 13 illustrates an example of a segmentation method.

Referring to FIG. 13, in operation 1301, a feature map of an image may be extracted through the feature extraction unit 110.

Subsequently, in operation 1302, a second slot matrix may be generated through the slot attention unit 120 by associating the feature map of the image with a first slot matrix corresponding to the image.

Lastly, in operation 1303, segmentation results of the image may be obtained based on the second slot matrix through the segmentation unit 130.

A detailed description of various operations of a segmentation apparatus is provided above with reference to FIGS. 1 through 13, and thus a more detailed and repeated description thereof will be omitted here for conciseness.

In a typical video panoramic segmentation algorithm, an input may be two adjacent frame images in a video (e.g., set as a frame t and a frame t−T), and an output may be a panoramic label image on the frame t. Some embodiments may continuously process each subsequent frame and obtain a final result of panoramic segmentation of the entire video.

However, a typical prior video panoramic segmentation algorithm may have two issues, as follows.

First, the typical algorithm may rely on numerous sub-operations. For example, to complete the algorithm, a boundary box module, a trace module, a mask module, a semantic segmentation module, and the like may be required, respectively, for such sub-operations as target detection, target tracing, instance mask segmentation, semantic segmentation, and the like. These sub-operations may have their own flaws. For example, when there is an occlusion between objects or when the shape of an object is irregular, the performance of target detection may be degraded. A final panoramic segmentation result may be obtained by combining results of the sub-operations. In this case, for example, when the results of the sub-operations are not desirable, subsequent correction may not be readily performed, which may result in poor performance of the final panoramic segmentation result.

Second, the algorithm may be extremely complex and have an excessive computational amount. Each of the sub-operations may have its own branches and a complex structure. In addition, the computational amount of the algorithm may increase to combine the results of the sub-operations.

By applying the segmentation apparatus and method described herein according to example embodiments, it is possible to significantly reduce the computational amount required to implement such an algorithm while improving the accuracy of an image segmentation result.

The computing apparatuses, segmentation apparatuses, the electronic devices, the processors, the memories, the information output system and hardware, the storage devices, and other apparatuses, devices, units, modules, and components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing. For example, the feature extraction unit, the slot attention unit, the segmentation unit, the space-domain slot attention module, the time-domain slot attention module, the space/time slot attention module, the prediction module, the slot verification module, and the like described above are implemented using a general-purpose processor, a special-purpose processor, a neural network processor (NPU), and/or the like.

It should be noted that the image segmentation apparatus and method described herein may rely entirely on the execution of computer programs or instructions to implement corresponding functions. That is, each device may correspond to a step in a functional architecture of a computer program, whereby the entire system may be invoked via a special software package (e.g., a lib library) to implement the functions.

The methods illustrated in FIGS. 1-13 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A computing device, comprising:
   one or more processors connected with a memory;
   the memory storing computer-readable instructions configured to cause the processor to:
      extract, from an image, a feature map of the image;
      extract a feature map of a history frame of a video including the image;
      generate a second slot matrix by associating the feature map of the image with a first slot matrix corresponding to the image, wherein the associating the feature map of the image with the first slot matrix corresponding to the image further comprises:
         performing one or more cascaded association operations including a space domain operation using the feature map of the history frame and a time domain operation using the feature map of the image; and
      obtain segmentation results of the image based on the second slot matrix.

2. The computing device of claim 1, wherein the image is a current frame of the video, and
   wherein the computer-readable instructions are further configured to cause the processor to:
      generate a fourth slot matrix by associating the feature map of the history frame with a third slot matrix corresponding to the history frame; and
      obtain segmentation results of the current frame and the history frame based on the second slot matrix and the fourth slot matrix,
   wherein the history frame is one or more frames chronologically preceding the current frame in the video.

3. The computing device of claim 2, wherein the history frame is one of a plurality of history frames,
   wherein the fourth slot matrix is one of a plurality of fourth slot matrices, each respectively corresponding to the history frames.

4. The computing device of claim 1,
wherein each of the association operations comprises:
associating the feature map of the image with an initial slot matrix or a slot matrix output from a previous association operation, and outputting an associated slot matrix.

5. The computing device of claim 2,
wherein each of the association operations comprises:
associating the feature map of the current frame with an initial slot matrix or a slot matrix corresponding to the current frame output from a previous association operation, and obtaining an associated slot matrix corresponding to the current frame;
associating the feature map of the history frame with an initial slot matrix or a slot matrix corresponding to the history frame output from a previous association operation, and obtaining an associated slot matrix corresponding to the history frame; and
associating the associated slot matrix corresponding to the current frame with the associated slot matrix corresponding to the history frame, and obtaining an associated slot matrix corresponding to the current frame and an associated slot matrix corresponding to the history frame.

6. The computing device of claim 2, wherein the performing the one or more cascaded association operations comprises:
performing one or more cascaded first association operations; and
performing one or more cascaded second association operations,
wherein each of the first association operations comprises:
associating the feature map of the current frame with an initial slot matrix or a slot matrix output from a previous first association operation, and outputting an associated slot matrix corresponding to the current frame, and
wherein each of the second association operations comprises:
associating the feature map of the history frame with an initial slot matrix or a slot matrix output from a previous second association operation, and outputting an associated slot matrix corresponding to the history frame.

7. The computing device of claim 6, wherein the associating the feature map of the image with the first slot matrix corresponding to the image further comprises:
associating a slot matrix corresponding to the current frame output from the first association operations with a slot matrix corresponding to the history frame output from the second association operations, and outputting an associated slot matrix corresponding to the current frame and an associated slot matrix corresponding to the history frame.

8. The computing device of claim 1, wherein a slot vector of the first slot matrix represents an object in the image.

9. The computing device of claim 1, wherein the obtaining the segmentation results of the image based on the second slot matrix comprises:
predicting a mask and a category based on the second slot matrix.

10. The computing device of claim 2, wherein the obtaining the segmentation results of the image based on the second slot matrix further comprises:
predicting a mask and a category of the current frame based on the second slot matrix;
predicting a mask and a category of the history frame based on the fourth slot matrix; and
determining an instance identifier (ID) based on the second slot matrix and the fourth slot matrix.

11. A method of segmenting an image, comprising:
extracting, from the image, a feature map of the image;
extract a feature map of a history frame of a video including the image;
generating a second slot matrix by associating the feature map of the image with a first slot matrix corresponding to the image, wherein the associating the feature map of the image with the first slot matrix corresponding to the image further comprises:
performing one or more cascaded association operations including a space domain operation using the feature map of the history frame and a time domain operation using the feature map of the image; and
obtaining segmentation results of the image based on the second slot matrix.

12. The method of claim 11, when the image is a current frame of the video, further comprising:
generating a fourth slot matrix by associating the feature map of the history frame with a third slot matrix corresponding to the history frame; and
obtaining segmentation results of the current frame and the history frame based on the second slot matrix and the fourth slot matrix,
wherein the history frame is one or more frames chronologically preceding the current frame in the video.

13. The method of claim 11, wherein the image is a current frame of a video comprising the current frame and history frames preceding the current frame in the video, the method further comprising:
extracting feature maps of the respective history frames of the video;
generating a plurality of fourth slot matrices by associating the feature maps of the history frames with respective third slot matrices respectively corresponding to the history frames; and
obtaining segmentation results of the current frame and the history frames based on the second slot matrix and the fourth slot matrices.

14. The method of claim 11,
wherein each of the association operations comprises:
associating the feature map of the image with an initial slot matrix or a slot matrix output from a previous association operation, and outputting an associated slot matrix.

15. The method of claim 12,
wherein each of the cascaded association operations comprises:
associating the feature map of the current frame with an initial slot matrix or a slot matrix corresponding to the current frame output from a previous association operation, and obtaining an associated slot matrix corresponding to the current frame;
associating the feature map of the history frame with an initial slot matrix or a slot matrix corresponding to the history frame output from a previous association operation, and obtaining an associated slot matrix corresponding to the history frame; and
associating the associated slot matrix corresponding to the current frame with the associated slot matrix corresponding to the history frame, and obtaining an associated slot matrix corresponding to the current frame and an associated slot matrix corresponding to the history frame.

16. The method of claim 12, wherein the performing the one or more cascaded association operations comprises:
  performing one or more cascaded first association operations; and
  performing one or more cascaded second association operations,
  wherein each of the first association operations comprises:
    associating the feature map of the current frame with an initial slot matrix or a slot matrix output from a previous first association operation, and outputting an associated slot matrix corresponding to the current frame, and
  wherein each of the second association operations comprises:
    associating the feature map of the history frame with an initial slot matrix or a slot matrix output from a previous second association operation, and outputting an associated slot matrix corresponding to the history frame.

17. The method of claim 16, wherein the associating the feature map of the image with the first slot matrix corresponding to the image further comprises:
  associating a slot matrix corresponding to the current frame output from the first association operations with a slot matrix corresponding to the history frame output from the second association operations, and outputting an associated slot matrix corresponding to the current frame and an associated slot matrix corresponding to the history frame.

18. The method of claim 11, wherein a slot vector of the first slot matrix represents an object in the image.

19. The method of claim 11, wherein the obtaining the segmentation results of the image based on the second slot matrix comprises:
  predicting a mask and a category based on the second slot matrix.

20. The method of claim 12, wherein the obtaining the segmentation results of the image based on the second slot matrix comprises:
  predicting a mask and a category of the current frame based on the second slot matrix;
  predicting a mask and a category of the history frame based on the fourth slot matrix; and
  determining an instance identifier (ID) based on the second slot matrix and the fourth slot matrix.

* * * * *